US006631370B1

United States Patent
Pekkanen

(10) Patent No.: US 6,631,370 B1
(45) Date of Patent: Oct. 7, 2003

(54) METHOD FOR DATA COLLECTING AND PROCESSING

(75) Inventor: Antti Pekkanen, Helsinki (FI)

(73) Assignee: InterQuest Oy, Helsinki (FI)

(*) Notice: Subject to any disclaimer, the term of this patent is extended or adjusted under 35 U.S.C. 154(b) by 198 days.

(21) Appl. No.: 09/721,878

(22) Filed: Nov. 27, 2000

(30) Foreign Application Priority Data

Sep. 20, 2000 (FI) .............................................. 20002077

(51) Int. Cl.[7] .............................................. G60F 17/30
(52) U.S. Cl. ........................................ 707/4; 434/322
(58) Field of Search ........................ 707/104.1, 4, 102, 707/505, 508; 434/322, 323, 355, 307 R

(56) References Cited

U.S. PATENT DOCUMENTS

| 5,754,938 | A | * | 5/1998 | Herz et al. ................... 725/116 |
| 5,842,195 | A | | 11/1998 | Peters et al. |
| 5,893,098 | A | | 4/1999 | Peters et al. |
| 5,974,398 | A | * | 10/1999 | Hanson et al. ................. 705/14 |
| 6,029,195 | A | * | 2/2000 | Herz ........................... 725/116 |
| 6,236,975 | B1 | * | 5/2001 | Boe et al. ....................... 705/7 |
| 6,332,129 | B1 | * | 12/2001 | Walker et al. ................. 705/26 |
| 6,431,875 | B1 | * | 8/2002 | Elliott et al. ................. 434/322 |

FOREIGN PATENT DOCUMENTS

| EP | 1035486 A2 | | 9/2000 |
| GB | 00301833.0 | * | 6/2000 |
| US | 99/10565 | * | 5/1998 |
| WO | 99/59096 A1 | | 11/1999 |

* cited by examiner

Primary Examiner—Safet Metjahic
Assistant Examiner—Sana Al-hashemi
(74) Attorney, Agent, or Firm—Birch, Stewart, Kolasch & Birch, LLP

(57) ABSTRACT

The object of the invention is a method for collecting data from users of terminals connected to a data network, through the said data network utilizing the terminals, by presenting to the users of the terminals one or more questions included in the questions of the inquiry. With the method according to the invention, the disturbance level directed to the user of the terminal is kept as low as possible by defining the maximum number of the questions to be answered by a single respondent. For each question is computed on the basis of the received answers at least one statistical characteristic after one or more answers given to the question. The selection of the questions to be presented can be based at least partly to the said statistical characteristics.

15 Claims, 3 Drawing Sheets

METHOD FOR DATA COLLECTING AND PROCESSING

BACKGROUND OF THE INVENTION

1. Field of the Invention

The object of the invention is a method for collecting data from users of terminals connected to a data network, through the data network utilizing the terminals, for storing the collected data in a database and for processing the data stored in the database and for presenting the results by presenting to the users of the terminals one or more questions.

2. Description of Related Art

In traditional marketing and opinion surveys the desired data is collected by using telephone inquiries, letters or by using personal inquiries or interviews. In these are usually used questions that are prepared in advance and the data given by the respondents are entered to answer forms. With one inquiry data can be collected on several matters, which either are or are not in dependence of each other. The data to be collected is either qualitative, quantitative or both.

To ease the processing of the answers, the questions are usually formatted so that the respondent chooses one or more of the presented alternatives. The answer form can be a traditional form printed on paper, which is filled by the respondent or by the interviewer. The interviewer can have at his disposal a laptop computer in which the inquiry form is stored completely or partly and the interviewer enters the data given by the respondent to the memory of the computer. The surveys performed in these traditional ways are, however, slow, costly and labor intensive.

In traditional questionnaires can also be used conditional questions, whereby the question or questions to be presented next is dependent on the answer given to this conditional question or on the chosen answer alternative.

When all the answers are received or answers are obtained sufficiently with regard to the object of the inquiry, the answers are collated and processed by using various methods, e.g. by computing various statistical characteristics from them. Based on the results and the analysis of them, conclusions are drawn from the studied subjects. The answers are processed usually at one time or in a few batches. In processing the answers various statistical methods are used on the basis of which the reliability and significance of the results and the conclusions drawn can be assessed.

In practice the inquiries can be directed to the whole target group only very seldom. For obtaining data, different methods are used for selecting the group of respondents from the target group in such a way that the selected group of respondents would represent as well as possible the target group, whereby also the received answers would reflect the attitude of the target group. While the collecting of the data e.g. by interviewing is expensive, the selection of the sample size has a very important meaning. The defining of the sample size is studied very much e.g. in the literature and scientific articles.

The statistical reliability of the results computed from the answers and of the conclusions based on these is ascertained after the whole material has been processed. The inquiries cannot usually be completed without endangering the reliability especially when the questions refer to actual matters.

Besides the traditional inquiring methods with letters, telephone and interviews, the use of the Internet has in the last years also come along, whereby the respondents give their answers through e-mail or directly to the questions shown on the display. By using the Internet substantial advantages are achieved compared to the traditional methods, because the data is received directly in suitable form for the processing equipment of the results.

One such method, in which the e-mail is utilized, is disclosed in the US-publications U.S. Pat. No. 5,893,098 and U.S. Pat. No. 5,842,195. In these publications is described i.e. a method for constructing the survey form. In the publication is also disclosed the use of branching questions, in other words, the following question or questions are determined based on the answer given by the respondent. In the publication is nothing disclosed on the way of selecting the respondents. In the publications is nothing disclosed either on it that to different respondents would be sent different questions or different number of questions in other case than basing on the given answers to the branching questions. In the publication is nothing disclosed either on defining the sample size in real time and/or individually and separately to each question according to certain criteria for reliability.

A typical data collecting by using the Internet comprises the following steps:

1. A visitor of the visitors of the Internet site is chosen e.g. randomly.
2. To the chosen visitor is presented an invitation to be a respondent in the inquiry e.g. with a window appearing on the display and in which window the respondent is given the opportunity to accept or reject the invitation.
3. When the visitor accepts the invitation, the questionnaire, loaded from the server of the author of the study, is opened in the browser window.
4. After giving his answers the respondent accepts the submitting of the given answers e.g. by clicking a button in the questionnaire, whereby the data given on the form are stored to the database of the author of the study.

The said invitation to the inquiry in the step 2 and the said questionnaire in the step 3 can also be shown in the same window, which opens up in presenting the invitation. Even in this alternative the visitor has the possibility of declining from the participation to the inquiry.

Instead of the random selection, the questions can be presented to all visitors or every visitor can participate to the inquiry according to his choice. If the visitor is identifiable, to the same visitor is not usually presented new invitations to participate within a certain time in spite of the answer of the visitor to the invitation to participate.

In inquiries by using the Internet the answers are received in real time to the database, which makes possible also the processing of the answers in real time. Also the reporting of the answers to the customers can take place in real time, even after the arrival of each answer.

The experiences from the use of the Internet show that the answering percentages are very high compared to the traditional inquiries done by letters, telephone or interviews. It can be expected, however, that when the inquiries performed through the Internet increase, the willingness to participate or answer will decrease. The users of the Internet may get irritated from the invitations appearing on the display and are not willing to give their opinions in spite of different incentives such as contests, lotteries, prizes etc.

The answering percentage is significantly influenced by the extent of the questionnaire. The shorter the questionnaire is, the smaller the disturbance of the inquiry is regarded and the higher is the answering percentage. The answering percentage has been observed to decrease strongly when the questionnaire has more than 15 questions.

SUMMARY OF THE INVENTION

The object of the invention is to provide a method, with which data is collected from the users of the terminals connected to a data network, preferably e.g. to the Internet, through the data network using the terminals, in such a way that the disturbance level caused by the data collection to the user of the terminal is as low as possible and at the same time statistically reliable results are achieved. The method comprises also the storing of the data to the database and the computing of one or more statistical characteristic based on the stored data.

It is characterizing to the method that the method comprises steps:
- the questions to be included in the inquiry are chosen from a store of questions,
- the number of the questions to be presented to the user of the terminal is chosen,
- the chosen number of questions is chosen from the questions included in the inquiry,
- the chosen questions are sent to the user of the terminal to be answered,
- the answers given by the user of the terminal are received,
- the received answers are stored to the data store of the answers,
- one or more statistical characteristic is computed based on the stored answers in the data store of the answers,
- the computed statistical characteristics are stored in the data store of the characteristics.

The store of the questions is composed preferably e.g. of the questions made for earlier inquiries by the authors of the inquiries and of the questions made for each inquiry. The stored questions in the store of the questions, composed earlier and used in earlier inquiries, can be provided with data on the received answers and on the statistical characteristics associated with them.

The method according to the invention is suitable to be utilized in all such data and data communication networks in which a number of terminals is connected to the network, the terminals being in connection through the network to at least one such a terminal having means for generating a connection to at least another terminal connected to the network, means for storing the questions to be sent to the terminal, means for choosing at least one terminal connected to the network for presenting a question to the chosen terminal, means for sending at least one question to at least one terminal connected to the network, means for storing the answer given from the terminal and means for processing the given answers.

By the disturbance and the disturbance level are meant both that, how often invitations are presented to the potential respondent to participate in the inquiry and how much time, concentration, attention, resources or other such efforts are needed for answering.

The sending of invitations can be controlled preferably e.g. by storing the identification data of the respondent in a separate database. In this database can also be stored the identification data of those respondents, which answer to the invitation negatively. In sending invitations can be checked, when an invitation has been sent to the respondent lastly and refrain from sending an invitation if certain time has lapsed since the preceding invitation. Another preferred method is e.g. in connection with the Internet to use the so-called "cookies", which assist in identifying the respondent or the terminal used by him to have visited the Internet site earlier. Corresponding methods for identifying the terminal and/or its user and/or verifying the previous visit or the moment of the previous connection can also be used in other data networks according to the connection protocols and programs used in them.

By the statistically reliable results are meant the reliability of the computed statistical characteristics based on the received answers and assessed with statistical methods.

The data is collected by presenting to the user of the terminal a number of questions to which he answers with his terminal. The presented questions are stored in the question database or in one or several files and the answers given by the user are stored in the answer database or in one or several files. Both the question and answer databases and/or the files can be in connection to the data network. The stored data in the question and answer databases are arranged preferably e.g. in such a way that the question and the answers given to it ca be mutually connected. In addition to the question and answer databases the system can consist of respondent database or one or several files in which the data identifying the respondent or the terminal used by the respondent is stored. These identifying data can be associated to each ongoing inquiry and/or to the answers given to it. The respondent database and/or the file can be in connection to the data network. The questions and/or the answers can also be stored in the same database and/or separate files. Such separate files can also be temporary files from which the stored data is transferred to databases or files.

A preferred embodiment of the method according to the invention comprises of steps:
1. The participant to the inquiry is chosen to the survey by sending the inquiry invitation through the data network to the terminal connected to the data network. The invitation can be presented either to users chosen randomly of all the users or the invitation is presented to all users or randomly or in some other way chosen users using the certain service offered through the data network.
2. When the user of the terminal answers favorably, to the terminal is sent one or more questions from the question database in connection with the data network to be answered by the user.
3. The answers given by the user of the terminal are sent through the data network to the answer database to be stored therein after the user has answered to one or more questions or to all questions.
4. When the answer is stored in the answer database, at least one reliability measuring characteristic relating to the question is computed based on the stored answers in the answer database corresponding to each presented and answered question and/or one or more other statistical characteristic describing this data set and/or a common reliability measuring characteristic or other common statistical characteristic concerning to two or more questions.
5. When the reliability measuring characteristic to some question and/or common to several questions reaches the desired level, this question or these questions are not anymore sent to be answered, but the said question or the said questions are removed from the set of the questions chosen to be answered in this survey.

The respondents can be chosen in the inquiries based on the Internet e.g. by sending the invitation to participate in the inquiry to the visitors of the certain Internet site. It is not necessary to know the e-mail address of the respondent or any other corresponding identifying data and it is often not even needed. The invitation is sent e.g. by choosing the respondents randomly of the visitors of the site. The invitation can also be presented to be answered to all visitors of the site in a window on the page or in a window or field opening up when the site is loaded. In a preferred embodiment of the invention the terminal and/or the user of the terminal to whom or which the invitation is sent, is identified e.g. by a password or code given by the user or by the characteristics included in the communications protocol of the data network. By identifying the user and comparing the identifying data of the user to the data in the respondent database, the sending of the invitation to the same inquiry and to the same respondent repeatedly can be avoided or the "disturbing" of the same user too often can be avoided. By identifying the respondent, the respondent can also be allowed to change the data given by him earlier, whereby the data given by the respondent earlier can be replaced with the data given later.

In a preferred embodiment of the invention, the invitation is also sent to users or terminals chosen in advance. The invitation can also be sent to selected users e.g. by using the e-mail. When the user wants to participate in the inquiry, the user receives to his terminal a question or questions by moving over to the Internet site given in the invitation by e-mail or to another corresponding address in the data network, to which a connection can be made with the terminal for enabling the participation in the inquiry. Instead of the e-mail the invitation can be presented e.g. in the mobile phone network as a short message or in another way characteristic to the data network used by the terminal.

The respondent answering favorably to the invitation is then given a set of questions to be answered. When the inquiry is composed of several questions, in a preferred embodiment of the invention, all the questions selected to the inquiry are not sent to the respondent to be answered for keeping the disturbance level of the inquiry low, but the minimum and/or maximum number of questions to be presented to one respondent at one time are defined in advance.

To keep the disturbance level low, in selecting the maximum number of questions to be presented, the terminal used by the respondent and/or the data network used in carrying out the inquiry can be taken into consideration. In a preferred embodiment of the invention the minimum and/or the maximum numbers of questions to be presented are selected for each respondent basing on the terminal used by the respondent or the type of the terminal and/or the data network used by the terminal and/or basing on the identification of the communications protocol used in the data network. For different terminals and/or for different data networks used by them and/or for the communications protocol being in use, the minimum and/or maximum numbers of questions to be presented can be defined.

In a preferred embodiment of the invention at least part of the questions sent to be answered are chosen randomly. The presentation order of the questions can also be changed for each respondent. To different respondents can also be sent different number of questions. The variation in the presentation order and the number of questions can be based e.g. on randomness or on the answers given by the respondent or on the reliability measuring characteristic computed on the base of the answers given earlier for each question or on other of one or several characteristics, which are computed on the base of earlier answers. The presentation order and the number of the questions to be presented can in a preferred embodiment of the invention be defined in advance before executing the inquiry.

The number of the questions sent to the respondents can vary during the inquiry e.g. in such a way that in the beginning all questions intended to be answered are sent to the respondents. According to the reliability measuring characteristics computed from the received answers or other statistical characteristic relating to the questions, the number of questions is decreased when the number of the participants in the inquiry increases. In addition to or instead of the reliability measuring characteristics and/or other statistical characteristic relating to the question, for determining the number of questions can be used reliability measuring characteristics or other statistical characteristic computed to two or more questions. The number of questions to be presented to the respondents can also be kept constant during all the time of the inquiry e.g. in such a way that the selected number of questions to be answered is chosen randomly or in other ways from the set of the questions to be presented. The selection can be based on the before mentioned reliability measuring characteristics or on other statistical characteristics computed from the received answers.

In a preferred embodiment according to the invention the data is collected in such a way that to the users of the terminals is presented at least one question of a question set consisting of one or more questions, to which the answers are given by using the terminal. The questions to be presented are selected from the set of questions included in the inquiry. Further in a preferred embodiment of the method according to the invention, the answers given by the user of the terminal are stored in the database, preferably e.g. in the answer database in such a way that the given answer can be associated to the presented question.

In a preferred embodiment of the invention the questions which are to be sent to the user of the terminal are selected in such a way that every question included in the inquiry will be presented at least so often that at least one of the characteristic, which is computed or can be computed from the answers received to it, is statistically at least as reliable at the selected reliability level as the corresponding characteristic, which would have been obtained by presenting to each respondent all the questions included in the inquiry. In another preferred embodiment of the method according to the invention at least one question to be presented to the user of the terminal is selected from the set of those questions, for which at least one characteristic of the computed statistical characteristics deviates from the target value defined to it. Still in a preferred embodiment of the method according to the invention to the user of the terminal is presented to be answered at least that question, for which the computed statistical characteristic deviates most from its defined target value. In selecting the questions to be presented to the user of the terminal, can in a preferred embodiment of the method according to the invention all such questions be selected to be presented, for which at least one common characteristic is computed. Further to the same user of the terminal are presented in a preferred embodiment of the method according to the invention all such questions to be answered, to which the answer is desired from the same respondent.

In a preferred embodiment of the method according to the invention, the user gives the answer to the presented question by selecting one or more of the given alternatives for the answer according to the instructions relating to the question. In the method can also be utilized the communications protocol between the data network and the terminal and/or the characteristics associated with the programs used in them and/or characteristics of the user interfaces preferably e.g. for preventing the selection of too many alternatives or for preventing of giving of other comparable answer which can be interpreted faulty or imperfect. The answer to the question can be given e.g. also by inputting alphanumeric text to the answering field of the question.

In a preferred embodiment of the method according to the invention, after every single item of data having been stored in the database, which data is collected with the method according to the invention, for every question is computed at least one statistical characteristic on the basis of the answers stored in the database after storing the answer given to this question and that the said statistical characteristic or the said statistical characteristics are stored in the database.

In a preferred embodiment of the method according to the invention one or more of said statistical characteristics are always computed, when a predetermined number of new answers are stored in the database or in the file. According to another preferred embodiment the said statistical characteristics can be computed also periodically.

Of the statistical characteristics to be computed at least one is preferably a reliability measuring characteristic describing the answers given to the said question. With the reliability measuring characteristic is meant preferably e.g. a confidence interval or other measure of confidence. For the data set consisting of the answers, which is a sample of the statistical population, e.g. a probability can be computed, with which some statistical estimate of the data set, e.g. the mean, is within a certain tolerance of error. The statistical characteristic computed from the answers is compared to a set target characteristic. If the computed characteristic is within the target values, the corresponding question can be removed from the set of questions, of which the questions to be presented to the respondents are selected.

In a preferred embodiment of the invention the reliability measuring characteristics to be computed and the associated probabilities and/or other characterizing properties are defined in advance before starting the survey. In another preferred embodiment of the invention the reliability measuring characteristics and/or the associated definitions can be changed during the survey.

It is known as such that every data set stored in the database composing of the answers given to the questions behaves statistically in a different way depending on the type of the data, e.g. depending on its distribution and also depending on the distribution of the variable to be studied. Therefore for reaching the same reliability level the necessary sample sizes are often different for different questions.

In a method according to the invention this variation in the statistically sufficient sample size relative to the question can be taken into consideration in such a way that every question is presented to be answered at least so often that one or more of the statistical characteristics, which can be computed on the basis of the answers received to that question, is statistically as reliable at the chosen reliability level as the corresponding characteristic, which would be obtained by presenting to every respondent all the questions of the question set. By proceeding in this way, it is not necessary to present all the questions to all respondents, whereby the disturbance of the inquiry can be decreased.

In addition to the reliability level of the answers given to a single question, statistical characteristics common to answers given to two or more questions can also be computed on the basis of the answer material, e.g. reliability measuring characteristics.

In a preferred embodiment of the invention at least one statistical reliability measure common to the data set consisting of two or more answers is computed. For example a reliability measuring characteristic can be computed for that, how many of the visitors of the certain Internet site is aged 25–35 years, married, and earning 30.000–50.000 €/year.

When all questions are not presented to all respondents, the interdependence of the questions has to be taken into consideration when selecting the questions. This can be taken into consideration in the method according to the invention in the procedure of the selection of the questions and/or associating to the question database or files the data on the interdependence of the questions. In a corresponding way can also be proceeded with such questions to all of which the answers are desired to be received from the same respondent. The question database or file can be composed in a preferred embodiment of the invention to comprise in addition to single questions also one or more question sets, which are treated in selecting questions like single questions. When the selection of the questions is directed to a question that belongs to such a question set, the whole question set is selected to be asked.

If advance information on the distribution of the variable to be measured exists, it can be taken into account in computing the reliability measuring characteristics or other statistical characteristics. Such advance information can be available e.g. when carrying out repeating studies especially when the composition of the respondent group is known to stay unchangeable or changing slowly. Such is the case also when the inquiry is directed e.g. to the registered users of a certain service and the users have in registering given certain basic data of themselves. The users of such services can often be identified e.g. on the basis of a password, which is given in connection with the registering and which is a condition for using the service, or of other identifier, e.g. an e-mail address. On the basis of the password a distinction can often be made between the different users using the same terminal.

It is characterizing to the method according to the invention that separately for each question to be presented, the sample size is defined, with which the desired reliability measuring characteristic or other statistical characteristic is attained. In another preferred embodiment of the invention, the required sample size for the desired reliability level is defined as a real-time process during the inquiry. The sample size can also be defined as a "nearly real-time" process, which means that the sample size is defined several times during the inquiry e.g. periodically or when a determined number of answers is received. In defining the sample size also the requirement on the reliability level required by two or more questions in common can be taken into account.

In the following a preferred embodiment of the invention is examined in more detail as an example. The example describes the execution of the inquiry by using the Internet but the corresponding inquiry can be performed also by using other data networks and terminals connected to them.

For performing the inquiry a set of questions is composed and they are stored in the question database. For every question two or more answer alternatives are defined.

In some of the questions the alternatives exclude each other, in other questions the respondent can choose one or more of the alternatives. Still questions can be presented, in which the respondent inputs to a text field one or more e.g. alphanumeric characters. The composing of such forms for use e.g. on the Internet sites is as such known.

The question database is associated with the answer database in which the answers given by the respondents are stored relative to each question. In a preferred embodiment of the invention the answers can also be associated with data making possible the identifying of the respondent or the terminal used by the respondent. The data associated with the identification of the respondents and/or the terminals used by them can also be stored in a separate respondent database.

The inquiry to be performed can be connected e.g. to a certain Internet page or site. To the visitor coming to this page is presented an invitation to participate in the inquiry by opening a separate window in the browser of the visitor. The invitation can also be presented on a bar on the page, in advertising or other banner in the page or being opened on the page or in a banner, which can be opened, or as a hyperlink on the page. The invitation can be presented to all visitors or it is presented by choosing the visitor e.g. randomly or in another way from the visitors. The presentation of the invitation can also depend on the data in the respondent database concerning the visitor or on the content of the "cookies" stored in the terminal of the visitor in such a way that the invitation is not sent to those terminals and/or users, to which or whom the corresponding invitation has been presented e.g. later than a certain predetermined moment of time. In this way the "disturbing" of the users can be decreased.

In a preferred embodiment of the present invention the identification data of the respondent can be associated with the answers given by the respondent in earlier inquiries in such a way that to the same respondent are not presented the same questions which have been presented to him in earlier inquiries, especially if it can be assumed that the answers would be the same as the answers given earlier by him. Such is e.g. the gender of the respondent.

If the user wants to participate in the inquiry, the questionnaire is loaded to the browser of the user from the server of the author of the inquiry. In the questionnaire to be loaded, the questions are selected preferably for each the respondent from all questions comprising the inquiry. The number and/or the presentation order can be preferably varied e.g. relative to the respondent randomly and/or by taking into consideration the answers received from previous respondents and/or the value or values of the statistical characteristics computed on the basis of those answers. In the initial phase of the inquiry all the questions composing the inquiry can be presented to the respondents to be answered, especially if the total number of the questions is so low that presenting all questions cannot be regarded to be too great with regard to the disturbance level. The total number of questions can be announced to the respondent in connection with the invitation, whereby the respondent himself can assess the disturbance caused to him by answering. In a preferred embodiment of the invention the respondent can be allowed to choose if he wants to answer all questions or only a limited number of questions. In this preferred embodiment the user of the terminal chooses the number of the questions either from the given number of alternatives or by giving the number of the questions he desires.

The questions can be presented one at a time or all the questions come in view or can be obtained to view at one time, If among the presented questions are questions, between which there is a interdependence in such a way that the next question to be presented depends on the given answer, it is advantageous to present the questions only one at a time or present at the same time to be seen and to be answered those questions in which the said interdependence is not included.

The given answers can be sent from the terminal of the respondent to the author of the inquiry either one answer at a time or when the respondent has given his answers to all of the questions presented to him.

The answers are stored in the answer database and with the computing device associated with the answer database the defined statistical characteristics are computed for the stored answer or answers, e.g. the mean and the associated reliability measuring characteristic or characteristics. The computation of these characteristics can be performed e.g. always when a new answer is stored in the answer database or the computation is performed until a predetermined number of new answers have been stored. A part of the characteristics or all of the characteristics can be computed always after a received answer and a part or all of the characteristics not until a certain number of answers are received or at certain intervals in time or depending on the value of another characteristic to be computed or as a combination of one or more of the aforementioned criteria.

The computed statistical characteristics are stored in the database in such a way that they can be combined to the questions stored in the database. In the database are also preferably stored e.g. the target values for the reliability measuring characteristics, whereby the computed reliability measuring characteristics can be compared to the target values with means suitably associated with the databases. When a computed reliability measuring characteristic reaches the target value, the question corresponding to it can be removed from the set of questions of which the questions are selected. When the question is associated with a reliability measuring characteristic which is common to another or to other questions, the question or the questions can not be removed until all the reliability measuring characteristics have reached their target values.

When the reliability measuring characteristics are computed continuously for each question, the questions to be presented can be selected from the set of all questions in such a way that the total time needed for performing the inquiry and/or the number of respondents needed can be obtained to be the least possible. When using randomness in the selection of the questions, the questions can also be weighted on the basis of the reliability measuring characteristics in such a way that the questions deviating most from the target value will appear more often. These weightings can be changed continuously basing on the received answers and on the statistical characteristics computed of these.

In the disclosed way, statistically reliable results can be reached, although all of the questions are not presented to all respondents. When only a limited number of questions are presented to the respondents, the disturbance level directing to the user can be regarded low.

The method according to the invention can be used in addition to the data collecting basing on the use of the Internet disclosed in the example, also in performing data collection in other data and data communication networks. Such networks include e.g. the internal networks of the companies or networks between companies or e.g. the mobile phone network, in which invitations can be presented and inquiries performed preferably e.g. by using the so-called short messages. As terminals can be used e.g. computers or terminals in connection to a wired or wireless network, mobile phones or other personal terminals or other devices, which are able to transmit and receive data in that network to which they are connected.

The method according to the invention is applicable also in such cases, in which the data collection is performed at least partially by using the same questions in utilizing simultaneously more than one data network. The data collection performed with the inquiry can be directed e.g. at the same time both to the visitors of the Internet pages and to the users of a mobile phone network. The received answers can be processed separately or the answers received through different data networks can be combined to the same file or database. Correspondingly the computation of the aforementioned statistical characteristics can be performed separately for answers that have come from different data networks or for the combined set of answers.

BRIEF DESCRIPTION OF THE DRAWINGS

The invention is described in the following more detailed with reference to the drawings, in which.

DETAILED DESCRIPTION

Figure 1:
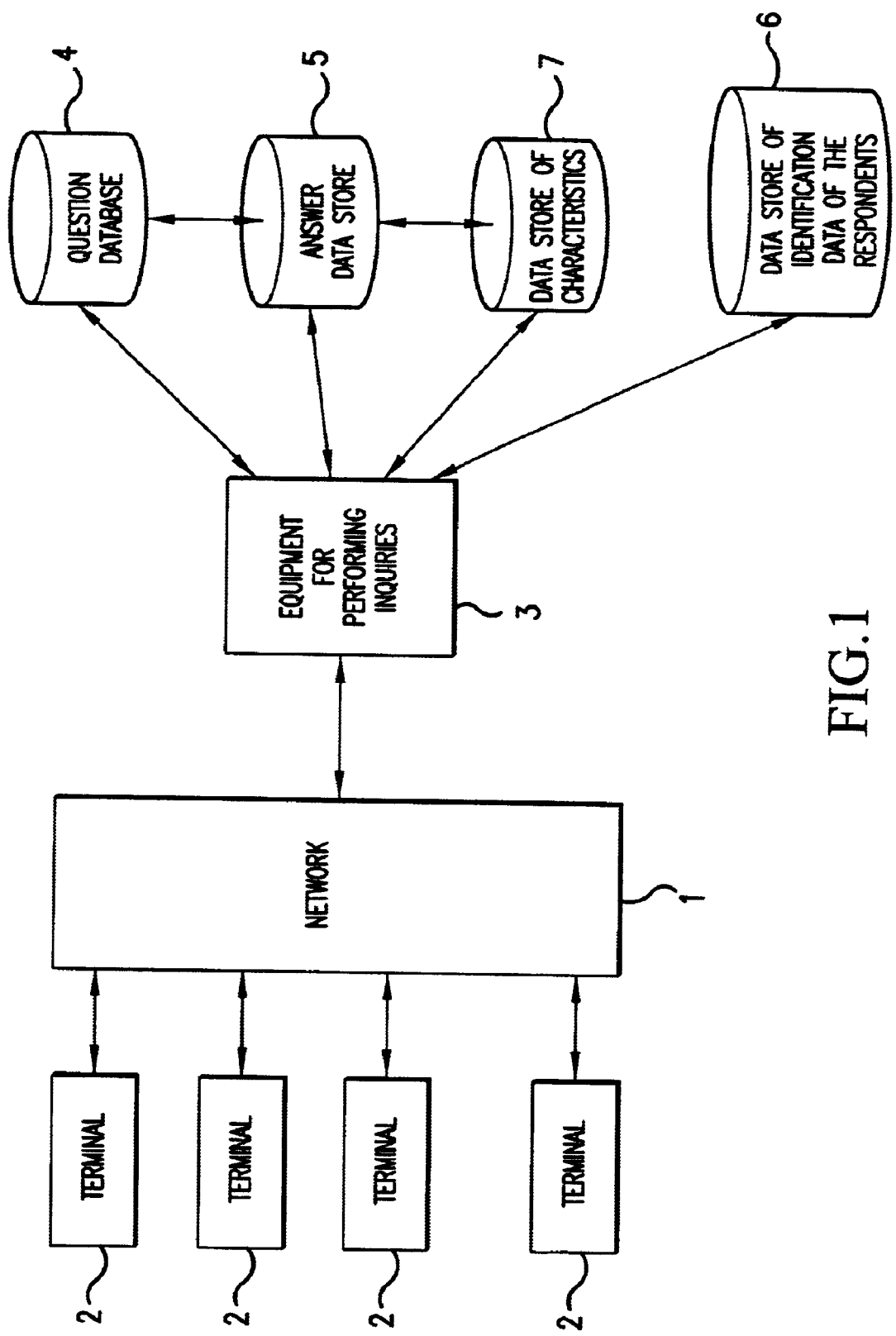
FIG. 1 shows the equipment for carrying out the method according to the invention.

FIG. 1 is shown schematically the system and the equipment for carrying out the method according to the invention. In FIG. 1 is referenced with the reference number 1 a data or data communication network, from the users of the terminals connected thereto, data is collected, and the terminals connected thereto are referenced with the reference number 2. With the reference number 3 is shown equipment for performing inquiries which equipment is in connection with the network 1. The equipment 3 preferably comprises means for forming a connection to the data network 1 and to the terminals 2 connected thereto, means for receiving data from the terminals 2 through the data network 1, means for storing the received data in means included in the equipment 3 or associated with it, preferably e.g. files and/or databases, and means for processing the data received from the terminals and/or data stored in means associated with the equipment. In a question database 4, which is associated with the equipment 3, are stored questions, which are intended to be asked in the inquiry. With the reference number 5 is referenced an answer data store comprising the answers which are sent from the terminals 2 and received with the equipment 3. With the reference number 6 is referenced a data store composed of identification data of the respondents. On the basis of the stored answers in the data store of the received answers 4, statistical characteristics associated to the presented questions are computed with means of the equipment 3 or associated thereto, which characteristics are stored in a data store of the characteristics 7. In the data store 7 is in a preferred embodiment stored target values for the statistical characteristics such as e.g. data describing the statistical reliability of the characteristics, which characteristics are computed on the basis of the answers. The data stores 4, 5, 6, and 7 comprise preferably one or more files and/or databases, in which the data is arranged in such a way that the data stored in these data stores can be processed, combined and edited with the means of the equipment 3. The equipment 3 comprises preferably also means for inputting data to the data stores 4, 5, 6, and 7 and/or for editing the data stored in the data stores 4, 5, 6, and 7. With these means can, e.g. questions intended to be presented, be inputted to the data store 5, the target values of the characteristics to the data store 7, and the identification data of the respondents to the data store 6. The equipment 3 is provided preferably also with means for selecting from the data store 5 of the questions the questions to be sent to the terminals.

Figure 2:
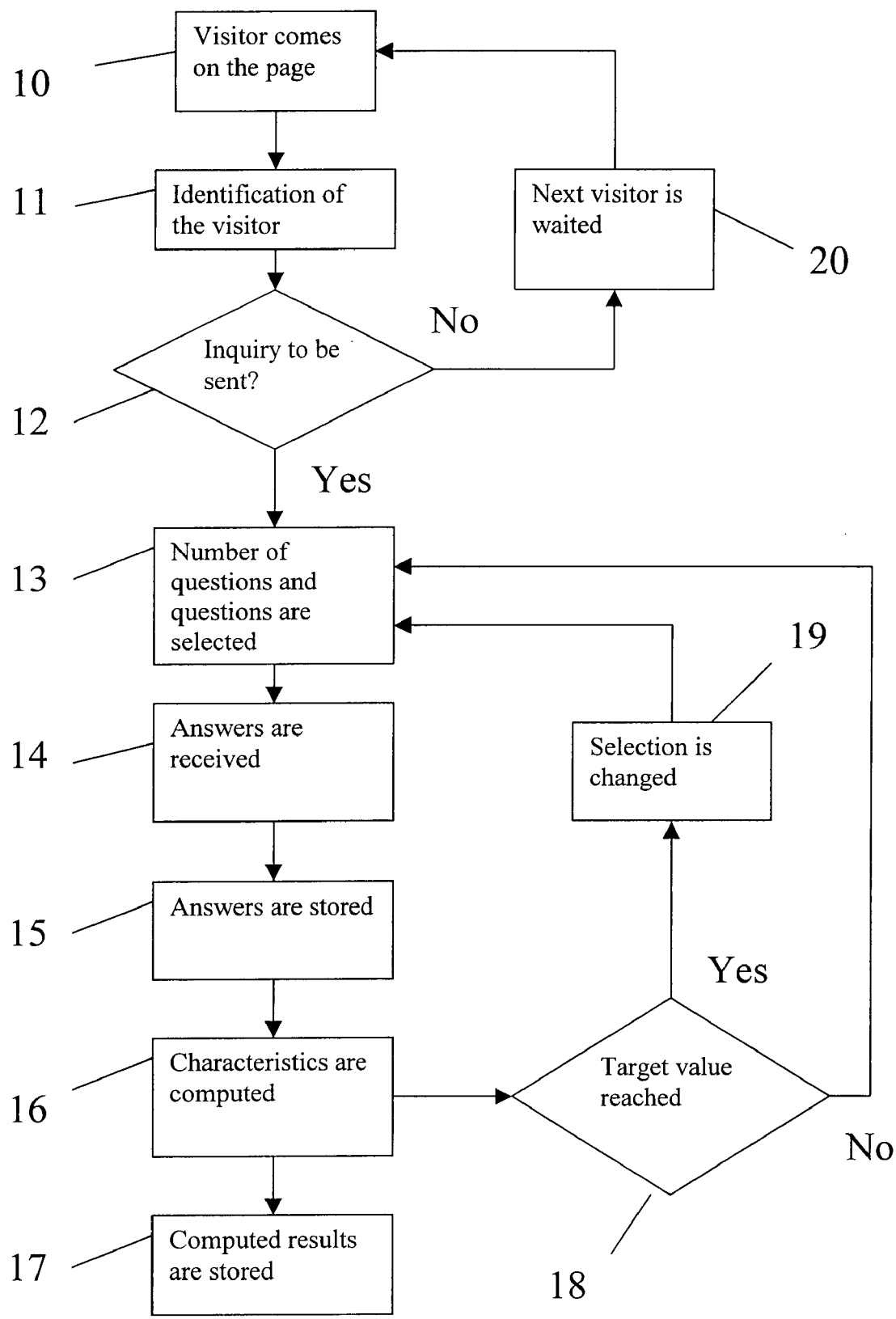
FIG. 2 shows schematically a preferred embodiment of the method according to the invention as a flow diagram.

In FIG. 2 is shown schematically an embodiment of an inquiry according to a preferred embodiment of the invention as a flow diagram. With reference number 10 is shown an arrival of a visitor to such a www-page, from the visitors of which data and/or opinions are desired to be collected preferably e.g. on the products, services, or companies presented on the said page or of other matters. In the block 11 the visitor is identified e.g. by an identification of the terminal used by the visitor. The purpose of the identification is e.g. to avoid presenting the same questions to the same visitor several times or to avoid presenting to the same visitor inquiries too often. Based on the identification of the visitor, a decision is made on sending the inquiry to the visitor. In the diagram is not shown the possibility offered to the visitor of refraining from participation to the inquiry, which is provided by the embodiment according to the example. The answer of the visitor of being willing to participate or of not participating to the inquiry is stored in the data store comprising in the equipment for carrying out the inquiry which data store contains the data on the respondents. If in the block 12 the decision is made that the inquiry is not sent e.g. either therefore that the visitor does not want to answer or therefore that the visitor already has participated to the inquiry being presented or that the previous suggestion for participation has taken place recently with regard to the disturbance, in the block 20 the next visitor is waited for. If it is decided that the inquiry is sent to the visitor, in the block 13 the questions to be presented to the visitor are selected from the set of the questions of the inquiry. The selection of the questions is performed in a preferred embodiment of the invention in two phases whereby preferably the number of the questions to be presented is selected first. The number of the questions to be presented is selected e.g. within the minimum and maximum numbers defined in advance. The said minimum and maximum numbers can in a preferred embodiment of the invention be changed during the inquiry. The selection of the number of the questions can also be based on the data network and/or the terminals used in the inquiry. The selected number of the questions is then selected from the set of questions to be presented.

In a preferred embodiment of the invention, the questions presented to the visitor are chosen randomly from the set of all questions. According to another preferred embodiment the questions to be presented are selected from the set of those questions, the associated statistical reliability measuring characteristics of which deviate from the set target values. In the block 14 the answers are received from the visitor according to the data network or networks and/or the terminals used in the inquiry and according to the communications protocols. The received answers are stored in the block 15 in the data store of the answers of the inquiry equipment or associated with it. Based on the received answers the statistical characteristics for the question and/or common for two or more questions are computed in the block 16. The characteristics are computed in a preferred embodiment of the invention after every received answer. The characteristics are not computed according to a preferred embodiment until a certain number of answers are received. The computation of the characteristics can be dependent on time according to a preferred embodiment. The computed characteristic are stored in the block 17 in the data store of the characteristics of the inquiring equipment or associated thereto preferably in such a way that the computed characteristics for the question can be combined to the said question for defining the statistical reliability of the received answers. In the block 18 the characteristics for the questions, computed on the basis of the received answers, are compared to the set target values of the said characteristics. In a preferred embodiment of the invention the selection of the questions to be presented to the visitor is changed in the block 19, when the target value for the question is reached. The target values for the characteristics are set preferably in advance before starting the inquiry. In a preferred embodiment of the invention in changing the selection 19, the questions for which the computed characteristics have reached the target value set to them are removed from the set of the questions to be presented or the selection of those questions for presentation is prevented in the block 13.

Figure 3:
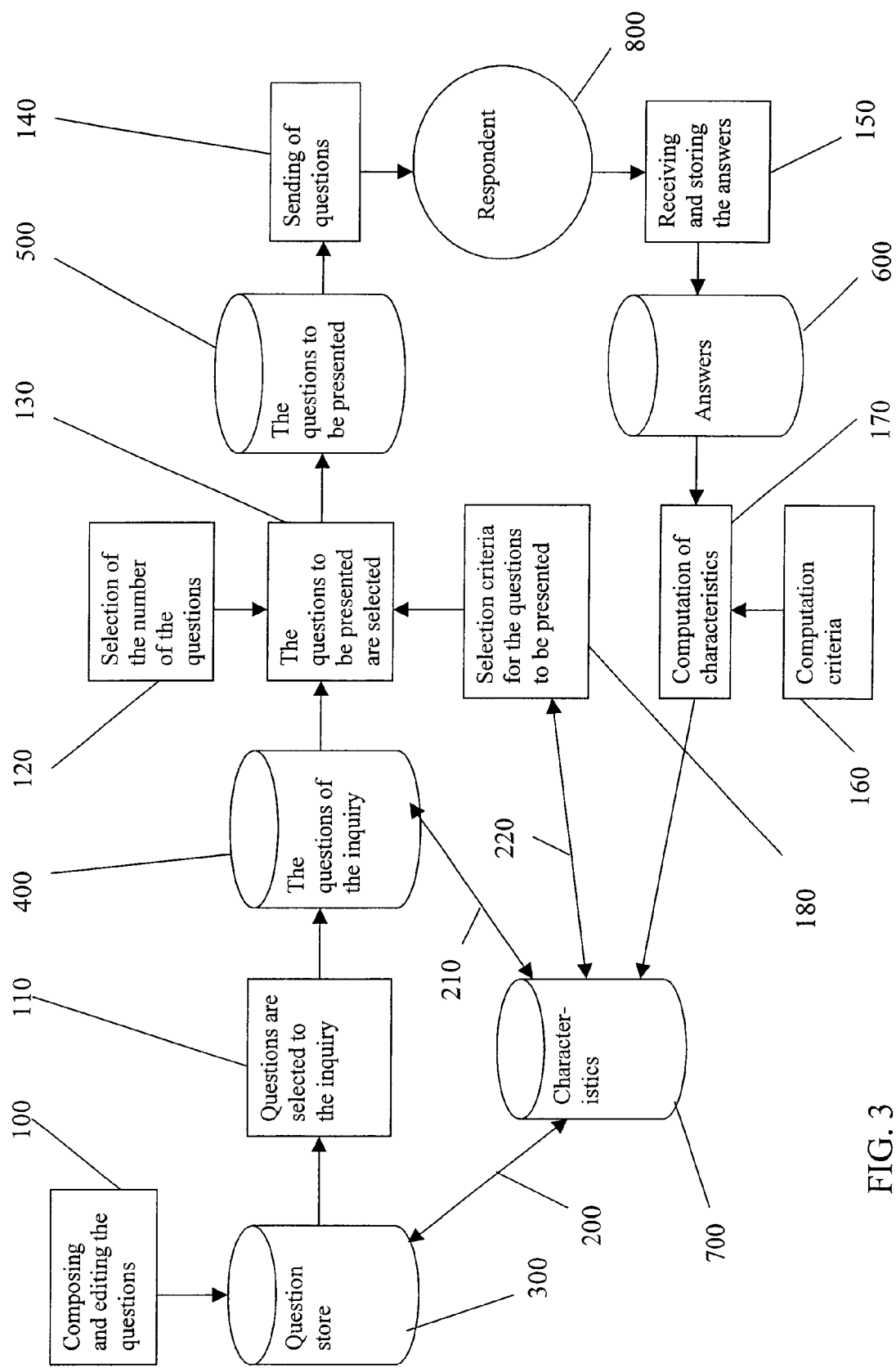
FIG. 3 shows the selection of the questions to be presented for answering as a diagram.

In FIG. 3 is shown schematically as an example processes associated with the selection of the questions to be presented to a user of the terminal, a respondent, in a preferred embodiment of the method according to the invention. Block 100 discloses composing of new questions by a composer or performer of the inquiry and/or editing of the questions in a question store 300. The question store is preferably e.g. one or more files and/or a database which can be processed with means intended for the composing of the questions, preferably e.g. with a computer. The composer chooses in the block 110 the questions composing the inquiry from the questions stored in the question store. These chosen questions are preferably stored in an own file and/or a database 400, which is in connection with means for composing of the questions and with means for sending these to the user of the terminal. In the block 120 the number of the questions to be presented is selected according to the principles and methods described earlier in the description. The number of the questions can be selected to be constant between the minimum and maximum numbers, randomly varying or on some other basis e.g. taking into consideration the network and/or the terminals connected thereto. In a preferred embodiment of the method according to the invention, the number of the questions is selected for every respondent 800 separately. In the block 130 is shown the selection of the questions to the respondent 800 from the questions chosen to the inquiry 400. The questions to be presented are chosen according to the selection criteria in the block 180. The questions to be presented are preferably stored e.g. in one and/or more files or databases 500. The questions to be presented to the respondent are sent 140 to the respondent 800, who gives his answers with his terminal. The obtained answers are received and stored 150 in the means of the performing the inquiry. The received and stored answers compose preferably one or more files and/or database 600. With the means for the performing of the inquiry or with means associated with them one or more characteristics are computed 170 on thee basis of the received answers according the earlier disclosure. The computation is controlled by the computing criteria 160 which define preferably e.g. what characteristics are computed, how each of the characteristics to be computed are computed and how often each of the characteristics to be computed is computed. The computed characteristics are stored in a data store of the characteristics 700, which preferably comprises one or more files and/or databases. The characteristics computed and stored in the data store 700 can in a preferred embodiment of the method according to the invention be used when preparing the criteria for the selection 180, as it is earlier disclosed in the description. This is described with the connection 220 between the data store 700 and the block 180. Correspondingly the data store of the computed characteristics in connection 200 to the store of the questions 300 and to the data store of the selected questions 400, which is described with the connection 210. In the data store of the characteristics 700 are stored in a preferred embodiment of the invention at least part of the computed characteristics from the earlier inquiries performed. The characteristics stored in the data store 700 can be associated with the questions.

What is claimed is:

1. A method for collecting data from users of terminals connected to a data network, through the data network utilizing terminals, for storing the collected data in a database and for processing the data stored in the database and for presenting results by presenting to the users of the terminals one or more questions, whereby the method comprises steps:

defining M questions to be included in an inquiry;
choosing K questions to be presented to a user of a terminal, K being smaller than M (K<M);
choosing a chosen number K of questions from the M questions included in the inquiry;
defining a number of remaining answers N needed for achieving desired reliability level;
sending the chosen questions to the user of the terminal to be answered;
receiving answers given by the user of the terminal; and
storing the received answers to a data store of the answers.

2. A method according to claim 1, whereby the number of remaining answers N is defined based on the number of chosen questions K and the number of all questions M.

3. A method according to claim 1, whereby the number of remaining answers N is defined based on the number of chosen questions K, the number of all questions M and computed statistical characteristics of the answers accumulated in the data store.

4. A method according to claim 1, whereby the questions and the number of the questions K presented to the users are changed based on the computed and stored statistical characteristics of the answers accumulated in the data store.

5. A method according to claim 1, whereby the number of questions which are presented to the user of the terminal is at least a minimum number defined in advance and at the most a maximum number defined in advance.

6. A method according to claim 1, whereby the number of the questions which are presented to the user of the terminal is chosen randomly.

7. A method according to claim 1, whereby to all users of the terminals is presented the same number of questions K.

8. A method according to claim 1, whereby the number of questions which are presented to the user of the terminal is at the most a number defined on the basis of the identification of at least one of the terminal and the data network used by it.

9. A method according to claim 4, whereby the questions which are to be sent to the user of the terminal are selected in such a way that every question included in the inquiry will be presented so that at least one of the statistical characteristics, which is computed or can be computed from the answers received to it, is statistically at least as reliable at the selected reliability level as the corresponding characteristic, which would have been obtained by presenting to each respondent all the questions M included in the inquiry.

10. A method according to claim 4, whereby at least one of the questions to be presented to the user of the terminal is selected from the set of those questions, for which at least one characteristic of the computed statistical characteristics deviates from the target value defined to it.

11. A method according to claim 8, whereby at least that question, for which the computed statistical characteristic deviates most from its defined target value, is presented to the user of the terminal to be answered.

12. A method according to claim 4, whereby at least one of the said characteristics to be computed is a common reliability measuring characteristic for this question and for at least another question.

13. A method according to claim 4, whereby at least one of the statistical characteristics to be computed is computed after storing every received answer and the characteristic is stored in the data store of the characteristics.

14. A method according to claim 4, whereby at least one of the statistical characteristics to be computed is computed when a predetermined number of questions have been received.

15. A method according to claim 4, whereby at least one of the statistical characteristics to be computed is computed after a predefined time after computation of some selected characteristic.

* * * * *